(12) United States Patent
Calabro et al.

(10) Patent No.: US 11,658,860 B2
(45) Date of Patent: May 23, 2023

(54) CLASS OF SYMBOL CONSTELLATIONS FOR DATA TRANSMISSION

(71) Applicant: Huawei Technologies Co., Ltd., Shenzhen (CN)

(72) Inventors: Stefano Calabro, Munich (DE); Maximilian Schaedler, Munich (DE); Fabio Pittala, Munich (DE); Maxim Kuschnerov, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/398,418

(22) Filed: Aug. 10, 2021

(65) Prior Publication Data
US 2021/0367828 A1 Nov. 25, 2021

Related U.S. Application Data

(63) Continuation of application No. PCT/EP2019/053308, filed on Feb. 11, 2019.

(51) Int. Cl.
*H04L 27/34* (2006.01)

(52) U.S. Cl.
CPC .................... *H04L 27/3411* (2013.01)

(58) Field of Classification Search
CPC .................................................. H04L 27/3411
See application file for complete search history.

(56) References Cited

U.S. PATENT DOCUMENTS

| | | | | |
|---|---|---|---|---|
| 7,535,975 | B1 * | 5/2009 | ten Brink | H04L 27/34 |
| | | | | 375/268 |
| 10,693,702 | B2 * | 6/2020 | Kayhan | H04L 27/3405 |
| 2009/0323866 | A1 * | 12/2009 | Bui | H04L 27/38 |
| | | | | 375/340 |
| 2013/0127558 | A1 * | 5/2013 | Clevorn | H04L 27/3411 |
| | | | | 332/183 |

(Continued)

FOREIGN PATENT DOCUMENTS

| CN | 101867437 A | * | 4/2009 |
|---|---|---|---|
| CN | 101867437 A | | 10/2010 |

(Continued)

OTHER PUBLICATIONS

Pfau, T., et al., "Hardware-Efficient Coherent Digital Receiver Concept With Feedforward Carrier Recovery for m-QAM Constellations", Journal of Lightwave Technology, vol. 27, No. 8, Apr. 15, 2009, 11 Pages.

(Continued)

*Primary Examiner* — Freshteh N Aghdam

(57) ABSTRACT

A transmitting device configured to obtain a message to be transmitted; map the obtained message onto a two-dimensional $2^n$-symbol constellation to obtain a sequence of discrete constellation symbols, where n is an odd number not less than 3. A receiving device configured to receive a sequence of noisy discrete constellation symbols; demap the sequence of noisy discrete constellation symbols to output data using a two-dimensional $2^n$-symbol constellation, where n is an odd number not less than 3.

20 Claims, 10 Drawing Sheets

(56) References Cited

U.S. PATENT DOCUMENTS

| | | | |
|---|---|---|---|
| 2015/0200747 A1 | 7/2015 | Petrov | |
| 2017/0237598 A1* | 8/2017 | Bench | H04L 27/3818 |
| | | | 375/261 |
| 2019/0268210 A1* | 8/2019 | Kayhan | H04L 27/3433 |

FOREIGN PATENT DOCUMENTS

| | | |
|---|---|---|
| CN | 104471861 A | 3/2015 |
| CN | 107040492 A | 8/2017 |
| LU | 93085 B1 | 11/2017 |

OTHER PUBLICATIONS

Forney., G.D., et al., "Efficient Modulation for Band-Limited Channels," published in the IEEE Journal on Selected Areas in Communications vol. 2, Issue 5, Sep. 1984, pp. 632-647, 16 pages.

Thomas., C.M., et al., "Digital Amplitude-Phase Keying with M-Ary Alphabets," published in the IEEE Transactions on Communications vol. 22, issue 2, Feb. 1974, pp. 168-180, 13 Pages.

ETSI EN 302 307 V1.3.1 "Digital Video Broadcasting (DVB);Second generation framing structure, channel coding and modulation systems for Broadcasting,Interactive Services, News Gathering and other broadband satellite applications (DVB-S2)," Mar. 2013, 84 Pages.

Conway, J.H. et al., "Sphere Packings, Lattices and Groups" Springer-Verlag, 1999, abstract downloaded from link: https://link.springer.com/book/10.1007/978-1-4757-6568-7, 8 pages.

* cited by examiner

CLASS OF SYMBOL CONSTELLATIONS FOR DATA TRANSMISSION

CROSS-REFERENCE TO RELATED APPLICATIONS

This application is a continuation of International Patent Application No. PCT/EP2019/053308, filed on Feb. 11, 2019, which is hereby incorporated by reference in its entirety.

TECHNICAL FIELD

The present disclosure relates to a data transmission procedure, and in particular, to a modulation method using a class of two-dimensional symbol constellations. The disclosure provides a transmitting device and a receiving device, both using two-dimensional symbol constellations.

BACKGROUND

In digital communications, the transmit messages are mapped onto a discrete alphabet, often referred to as a symbol constellation.

In the case of bandpass systems, two orthogonal carrier phases, typically denoted as in-phase (I) and quadrature (Q) components, are used to span the symbol space. Thus, two-dimensional symbol constellations are a natural choice. By converse, on low-pass systems one-dimensional constellation are typically adopted. However, also low-pass systems can employ two-dimensional constellations if two distinct signaling intervals are used to span a two-dimensional space.

The size of the symbol constellation determines how many bits can be mapped on each symbol. A constellation of 2n symbols can carry n bits per signaling interval.

The bijection between symbols and binary n-tuples is called bit mapping. In a Gray mapping the binary n-tuples of any two neighboring symbols differ in only one bit. Not all symbol constellations admit a Gray mapping. If a Gray mapping does not exist, a mapping that minimizes the Hamming distance between the binary n-tuples of neighboring symbols is called a quasi-Gray mapping.

A pragmatic approach to channel coding, called bit-interleaved coded modulation (BICM), consists in cascading a binary encoder and a bit-mapper at the transmitter and a bit-demapper and binary decoder at the receiver. In case a BICM is used, Gray mapping or quasi-Gray mapping achieves the best performance. At the receiver the bit-demapper can provide tentative decisions (hard demapper) or probabilities of each bit being 0 or 1 (soft demapper).

The transmitter converts the sequence of discrete constellation symbols to a signal matched to the transmission channel, e.g. to a bandpass signal. Most practical transmitters are limited in the output power of the output signal. The limitation may arise from different factors as e.g. thermal issues or a nonlinear distortion.

If the available power budget depends on a bandpass power amplifier, the power limitation applies to the two-dimensional constellation, i.e. to the I and Q components jointly. However, in many systems, including optical systems, the power limitation applies separately to the I and Q components of the constellation.

Unfortunately, known constellations are optimized with respect to the noise sensitivity regardless of the peak-to-average power ratio (PAPR) or with respect to the PAPR in two dimensions. The PAPR in one dimension (PAPR-1D) has not been taken into account so far.

SUMMARY

In view of the above-mentioned limitations and disadvantages, alternative symbol constellations are desired. An objective is to provide symbol constellations that are optimized with respect to the peak signal power in one dimension.

The objective is achieved by the embodiments provided in the enclosed independent claims. Advantageous implementations of the embodiments of the present disclosure are further defined in the dependent claims.

A first aspect of the disclosure provides a transmitting device adapted for using two-dimensional symbol constellations, the transmitting device being configured to obtain a message to be transmitted; map the obtained message onto a two-dimensional 2n-symbol constellation to obtain a sequence of discrete constellation symbols, where n is an odd number not less than 3, wherein the two-dimensional 2n-symbol constellation consists of 2n points arranged along the perimeters of q concentric squares, where q is a positive integer; and transmit the symbols.

With the symbol constellation used by the device of the first aspect, an optimization with respect to the peak signal power in one dimension is achieved. This is due to the arrangement of the constellation points on squares rather than circles.

A class of two-dimensional symbol constellations consisting of points arranged along the perimeters of q concentric squares ($q \in \mathbb{N}$, i.e. q is a positive integer) is introduced. Although such construction can be used for any 2n-symbol constellation with integer n, it is especially useful for odd values of n, since in this case alternative solutions are not satisfactory for the considered class of transmitters.

In an implementation form of the first aspect, the transmitting device is further configured to convert the sequence of discrete constellation symbols to a signal matched to a transmission channel; and transmit the signal, particularly to a receiving device.

The transmitter may particularly convert the sequence of discrete constellation symbols to a signal matched to the transmission channel, e.g. to a bandpass signal.

In an implementation form of the first aspect, the points in each concentric square of the two-dimensional 2n-symbol constellation are uniformly spaced along the perimeter and four points are located at the corners.

In contrast to many known geometrically shaped constellations, which exhibit a circular or quasi-circular shape, the two-dimensional 2n-symbol constellations according to the present disclosure, due to their square shape, are beneficial for specifically transmitters whose power budget is limited in each dimension separately rather than in the two dimensional space.

In an implementation form of the first aspect, the two-dimensional 2n-symbol constellation is further defined by the following characteristics, the sides of the concentric squares are parallel to the I and Q axis, and the center of the squares coincides with the origin of the I-Q plane, the side of the i-th square has length $L_i$ with $L_1 < L_2 < \ldots < L_q$, the i-th square contains $4 \cdot N_i$ points, with $N_i$ is an integer number and $N_1 \leq N_2 \leq \ldots \leq N_q$.

The two-dimensional 2n-symbol constellations are particularly parametrized by $L_i$ and $N_i$ (i=1, 2, ..., q).

In an implementation form of the first aspect, the parameters $L = [L_1, \ldots, L_q]$ and $N = [N_1, \ldots, N_q]$ of the two-dimensional 2n-symbol constellation have been optimized by minimizing a cost function.

The parameters can be optimized by minimizing the required signal-to-noise ratio (RSNR) at a target bit error rate (BER) and the PAPR-1D.

In an implementation form of the first aspect, the cost function is expressed as:

$$f(L,N)=\text{RSNR}+\text{PAPR1D},$$

where $L=[L_1, L_2, \ldots, L_q]$, $N=[N_1, N_2, \ldots, N_q]$, RSNR represents a RSNR at the target BER and PAPR1D represents a PAPR in one dimension and both RSNR and PAPR1D are expressed in decibels (dB).

This function essentially describes the ratio between the peak signal power in one dimension and the average noise power. It is selected based on the observation that the fundamental transmitter resource is the one-dimensional peak signal power rather than the average signal power or the peak signal power in two dimensions. The optimization of the cost function implies that the constellation achieves a good performance in terms of BER vs. peak power to noise ratio in one dimension.

In an implementation form of the first aspect, n is equal to 5, q is equal to 3, L1 is equal to 2, L2 is equal to 6, L3 is equal to 10, and N1 is equal to 1, N2 is equal to 3, N3 is equal to 4.

In an embodiment, an optimized 32-symbol constellation is proposed.

In an implementation form of the first aspect, n is equal to 7, q is equal to 6, L1 is equal to 2, L2 is equal to 6, L3 is equal to 10, L4 is equal to 14, L5 is equal to 18, L6 is equal to 22, and N1 is equal to 1, N2 is equal to 3, N3 is equal to 5, N4 is equal to 7, N5 is equal to 7, N6 is equal to 9.

In an embodiment, an optimized 128-symbol constellation is proposed.

In an implementation form of the first aspect, the transmitting device is configured to perform a Gray mapping or a quasi-Gray mapping to map the obtained message onto the two-dimensional 2n-symbol constellation.

A Gray mapping or a quasi-Gray mapping may be implemented to achieve the best performance.

A second aspect of the present disclosure provides a receiving device adapted for using two-dimensional symbol constellations, the receiving device being configured to receive a sequence of noisy discrete constellation symbols; demap the sequence of noisy discrete constellation symbols to output data using a two-dimensional 2n-symbol constellation, where n is an odd number not less than 3, wherein the two-dimensional 2n-symbol constellation consists of 2n points arranged along the perimeters of q concentric squares, where q is a positive integer.

The device of the second aspect supports achieving the advantages described above for the device of the first aspect.

In an implementation form of the second aspect, the receiving device is configured to receive a signal, particularly from a transmitting device; and convert the received signal to a sequence of noisy discrete constellation symbols.

The signal transmitted from the transmitting device may be received and converted at the receiving device. The sequence obtained after the transmission and converting process may not be an ideal discrete constellation symbols sequence, but a sequence of noisy discrete constellation symbols.

In an implementation form of the second aspect, the receiving device is configured to perform a hard demapping or a soft demapping based on a Gray or a quasi-Gray mapping.

At the receiver side, the bit-demapper can provide tentative decisions (hard demapper) or probabilities of each bit being 0 or 1 (soft demapper).

A third aspect of the present disclosure provides a method for transmitting messages using two-dimensional symbol constellations, the method comprising obtaining a message to be transmitted; mapping the obtained message onto a two-dimensional 2n-symbol constellation, where n is an odd number not less than 3, wherein the two-dimensional 2n-symbol constellation consists of 2n points arranged along the perimeters of q concentric squares, where q is positive integer; and transmitting the symbols.

The method of the third aspect may have implementation forms that correspond to the implementation forms of the device of the first aspect. The method of the third aspect and its implementation forms provide the same advantages and effects as described above for the transmitting device of the first aspect and its respective implementation forms.

A fourth aspect of the present disclosure provides a method for receiving messages using two-dimensional symbol constellations, the method comprising receiving a sequence of noisy discrete constellation symbols; demapping the sequence of noisy discrete constellation symbols to output data using a two-dimensional 2n-symbol constellation, where n is an odd number not less than 3, wherein the two-dimensional 2n-symbol constellation consists of 2n points arranged along the perimeters of q concentric squares, where q is positive integer.

The method of the fourth aspect may have implementation forms that correspond to the implementation forms of the device of the second aspect. The method of the fourth aspect and its implementation forms provide the same advantages and effects as described above for the receiving device of the second aspect and its respective implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of embodiments, a functionality or step to be performed by external entities is not reflected in the description of a detailed element of that entity which performs that step or functionality, it should be clear for a skilled person that these methods and functionalities can be implemented in respective software or hardware elements, or any kind of combination thereof.

DETAILED DESCRIPTION OF EMBODIMENTS

Figure 1:
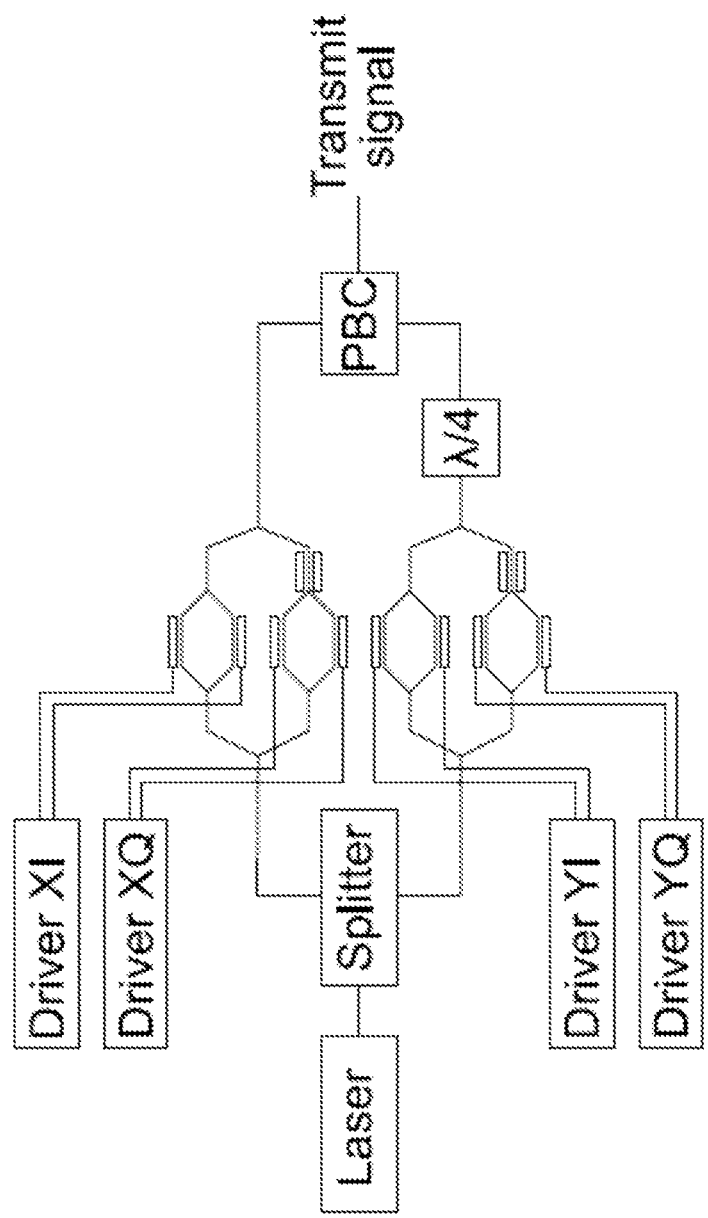
FIG. 1 shows an example of a coherent optical transmitter.

As illustrated in FIG. 1, in a coherent optical transmitter the power of the transmit laser is equally split between two orthogonal polarization planes X and Y, and each polarization plane is equally split between the I and Q components. Each tributary (XI, XQ, YI, YQ) is modulated via a Mach-Zehnder modulator that "carves" the desired signal shape by attenuating the laser. Therefore, the maximum power per dimension is limited. Further, the laser emits constantly the maximum power in this type of transmitters and the modulation is achieved by dissipating the power in excess. Therefore, the cost in terms of power efficiency and thermal dissipation is determined by the peak power rather than the average power.

In general, the available transmit power is directly related to the maximum link budget. In some applications the power of the two-dimensional signal can be enhanced along the link by using inline repeaters, i.e. amplifiers. However, this requires additional components and deteriorates the signal-to-noise ratio of the signal.

In any case, for a given transmitter, with a given peak power, the choice of the symbol constellation affects the average transmit power. Therefore, it is desirable to identify symbol constellations that maximize the average transmit power without compromising the noise sensitivity of the system.

It is an open problem to find two-dimensional constellations that achieve this goal for the case of transmitters whose power budget is limited separately in each dimension.

Figure 2:
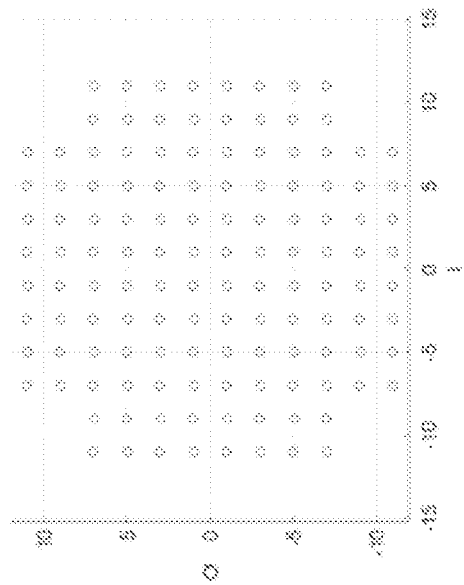
FIG. 2 shows an example of a cross 32QAM (left) and a cross 128QAM (right) symbol constellations.
Figure 2:

Two-dimensional constellations are used in quadrature amplitude modulation (QAM) schemes. Many QAM constellations have been proposed. For $n=2 \cdot m$, square constellations of $2^m \times 2^m$ points, as e.g. 16QAM, 64QAM, 256QAM, are the usual choice. For $n=2 \cdot m+1$, cross constellations, e.g. cross 32QAM and cross 128QAM, are the most common choices. FIG. 2 illustrates examples of the cross 32QAM and cross 128QAM symbol constellations. Cross-constellations do not use the corner points and therefore have a reduced peak-to-average power ratio (PAPR) in two dimensions.

In another example, the digital video broadcasting-satellite 2nd generation (DVB-S2) system uses constellations of points distributed along concentric rings. These constellations have a lower PAPR in two dimensions than cross constellations.

Unfortunately, known 2n-symbol constellations (including the above described examples), where $n=2 \cdot m+1$, are optimized with respect to the noise sensitivity regardless of the PAPR or with respect to the PAPR in two dimensions. The PAPR in one dimension (PAPR-1D) has not been taken into account so far.

The present disclosure therefore introduces a class of two-dimensional 2n symbol constellations, where n is an odd number, consisting of 2n points arranged along the perimeter of q concentric squares ($q \in \mathbb{N}$, i.e. q is a positive integer).

Figure 3:
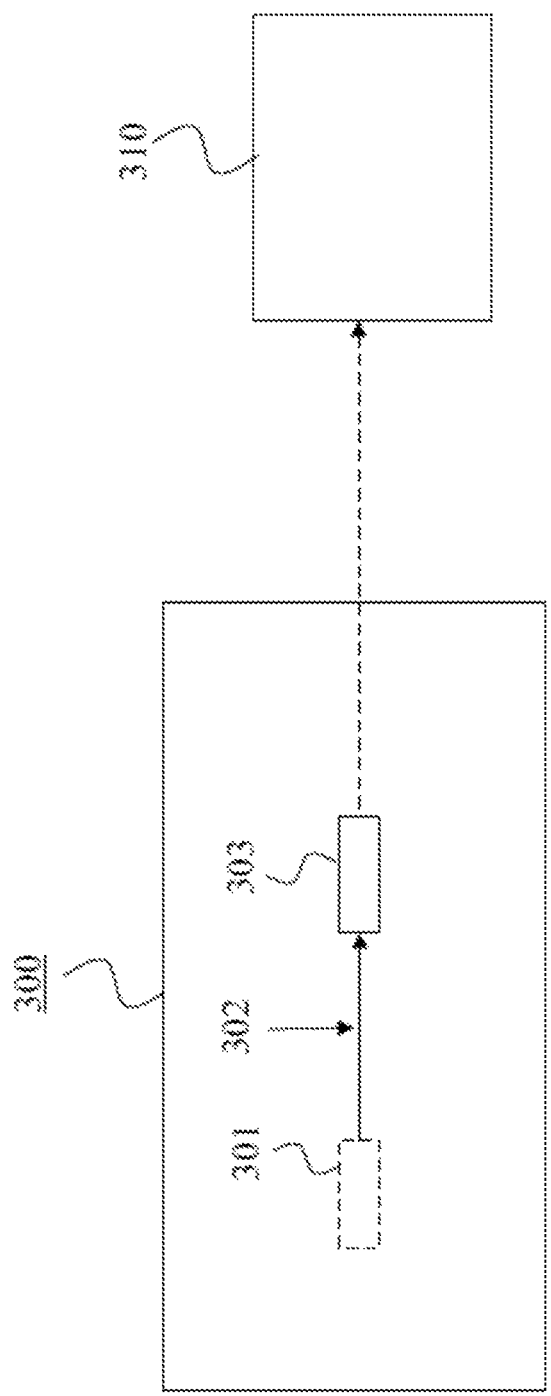
FIG. 3 shows a transmitting device according to an embodiment of the disclosure.

FIG. 3 shows a transmitting device 300 according to an embodiment of the disclosure. The transmitting device 300 is configured to obtain a message 301 to be transmitted; map the obtained message 301 onto a two-dimensional 2n-symbol constellation 302 to obtain a sequence of discrete constellation symbols 303, where n is an odd number not less than 3, wherein the two-dimensional 2n-symbol constellation 302 consists of 2n points arranged along the perimeters of q concentric squares, where q is a positive integer; and transmit the symbols 303.

The transmitting device 300 may be a transmitter in an optical system, or in another communication system, and may comprise components like a bit-encoder and a bit-mapper.

The transmitting device 300 may be further configured to convert the sequence of discrete constellation symbols to a signal matched to the transmission channel, e.g. to a bandpass signal. Further, the transmitting device 300 may send the signal to a receiving device 310. The receiving device 310 may be a receiver in an optical system, or in another communication system, and may comprise components like a bit-decoder and a bit-demapper.

The constellations applied in embodiments of the present disclosure may satisfy a condition that in each concentric square the points are uniformly spaced along the perimeters and four points are located at the corners.

Optionally, the constellations may be further defined by the following characteristics, the sides of the squares are parallel to the I and Q axis and the center of the squares coincides with the origin of the I-Q plane; the side of the i-th square has length $L_i$ with $L_1 < L_2 < \ldots < L_q$; the i-th square contains $4 \cdot N_i$ points with $N_1 \geq N_2 \geq \ldots \geq N_q$.

The constellations may thus be parametrized by $L_i$ and $N_i$ ($i=1, 2, \ldots, q$). The parameters can be optimized by minimizing the required signal-to-noise ratio (RSNR) at the target BER and the PAPR-1D. In particular, the cost function $$f(L,N) = \text{RSNR} + \text{PAPR1D} \text{ (in dB)}, \quad (1)$$

can be minimized, where $L=[L_1, L_2, \ldots, L_q]$ and $N=[N_1, N_2, \ldots, N_q]$.

This function essentially describes the ratio between the peak signal power in one dimension and the average noise power. Its choice derives from the observation that the fundamental transmitter resource is the one-dimensional peak signal power rather than the average signal power or the peak signal power in two dimensions.

In contrast to many known geometrically shaped constellations, which exhibit a circular or quasi-circular shape, the constellations according to embodiments of the present disclosure, due to their square shape are, specifically conceived for transmitters whose power budget is limited in each dimension separately rather than in the two dimensional space.

The optimization of the cost function (1) implies that the constellations achieve a good performance in terms of BER vs. peak power to noise ratio. Furthermore, the proposed construction has some practical attractive features.

Differently from an unconstrained optimization, in which the position of the 2n symbols is freely optimized, a regular structure is enforced. In addition, the fact that the symbols are distributed along concentric squares simplifies the implementation of the demapper at the receiver end.

Figure 8:
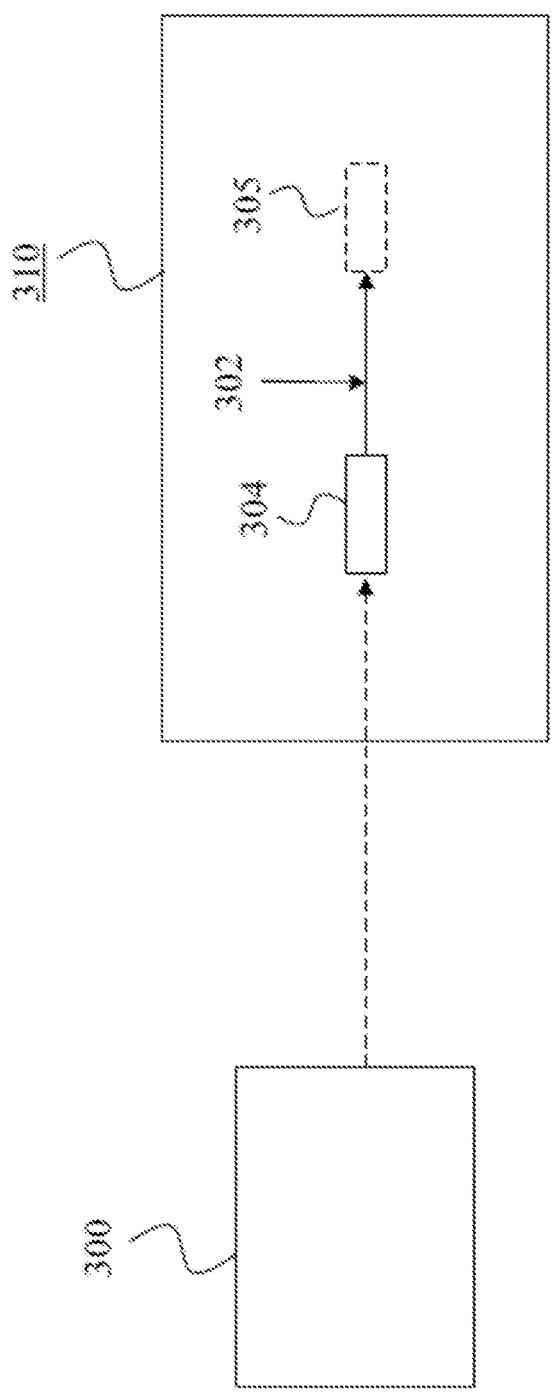
FIG. 8 shows a receiving device according to an embodiment of the disclosure.

In a typical use case, the selection of the constellation happens during the design phase. Optionally, it is also possible to select the constellation dynamically during operation. In this case, a signaling protocol between the transmitting device 300 and a receiving device (e.g. as shown in FIG. 8) may be defined.

The constellations are designed to work well with feed-forward carrier-phase estimation (CPE) schemes, which are typically used in high-rate applications as e.g. optical communications. Due to the presence of symbol points on the corners of each square, the constellations are well-suited for blind carrier phase estimation, which can be implemented e.g. by means of the well-known Viterbi-Viterbi (fourth power) algorithm (A. J. Viterbi and A. N. Viterbi, "Nonlinear estimation of PSK-modulated carrier phase with application to burst digital transmission," IEEE Trans. Inf Theory, vol. 29, no. 4, pp. 543-551, 1983). In particular, the outer corner symbols provide a very important contribution to the phase estimate because they exhibit the best ratio between symbol energy and noise power.

It should be noted that the construction of constellations according to embodiments of the present disclosure can be used for any integer n, but is especially useful for odd values of n since in this case alternative solutions are not satisfactory for the considered class of transmitters.

According to an embodiment of the present disclosure, a 32-symbol constellation is proposed. The parameters of the constellation can be optimized using the cost function (1). The parameters of the optimized 32-symbol constellation are listed in Table 1.

TABLE 1

Parameters of the optimized 32-symbol constellation.

| Number of bits per symbol | n | 5 |
|---|---|---|
| Number of concentric squares | q | 3 |
| Side lengths of the squares | L | [2, 6, 10] |
| Number of points per side | N | [1, 3, 4] |

Figure 4:
FIG. 4 shows an example of a 32-point constellation and adopted mapping in octal notation according to an embodiment of the present disclosure.

The proposed 32-symbol constellation, namely, concentric square-32QAM (CS-32QAM), and the adopted quasi-Gray mapping are illustrated in FIG. 4.

Figure 5:
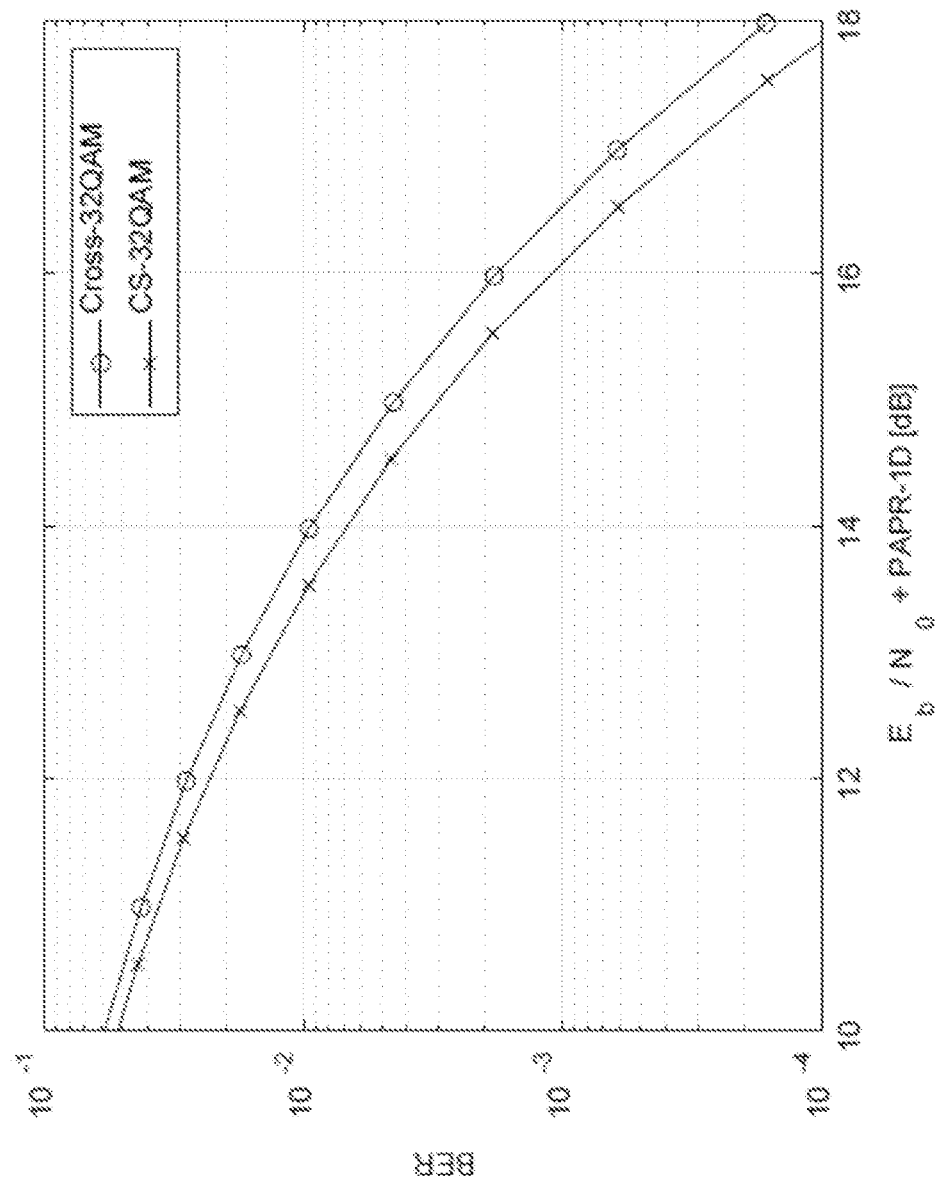
FIG. 5 shows an example of performance of a 32-symbol constellation over the AWGN channel according to an embodiment of the present disclosure.

As shown in FIG. 5, over the additive white Gaussian noise (AWGN) channel the 32-symbol constellation (CS-32QAM) according to this embodiment of the present disclosure performs ~0.5 dB better than cross-32QAM (illustrated on the left side of FIG. 2) in terms of $Eb/N0+PAPR-1D$, where $Eb$ is the average energy per bit, $N0$ is the standard deviation of the two-dimensional noise and, accordingly, $Eb/N0$ is the adopted signal-to-noise ratio.

According to another embodiment of the present disclosure, a 128-symbol constellation is proposed. Similar as the 32-symbol constellation according to the previous mentioned embodiment, the parameters of the 128-symbol constellation also can be optimized using the cost function (1). The parameters of the optimized 128-symbol constellation are listed in Table 22.

TABLE 2

Parameters of the optimized 128-symbol constellation.

| Number of bits per symbol | n | 7 |
|---|---|---|
| Number of concentric squares | q | 6 |

TABLE 2-continued

Parameters of the optimized 128-symbol constellation.

| Side lengths of the squares | L | [2, 6, 10, 14, 18, 22] |
|---|---|---|
| Number of points per side | N | [1, 3, 5, 7, 7, 9] |

Figure 6:
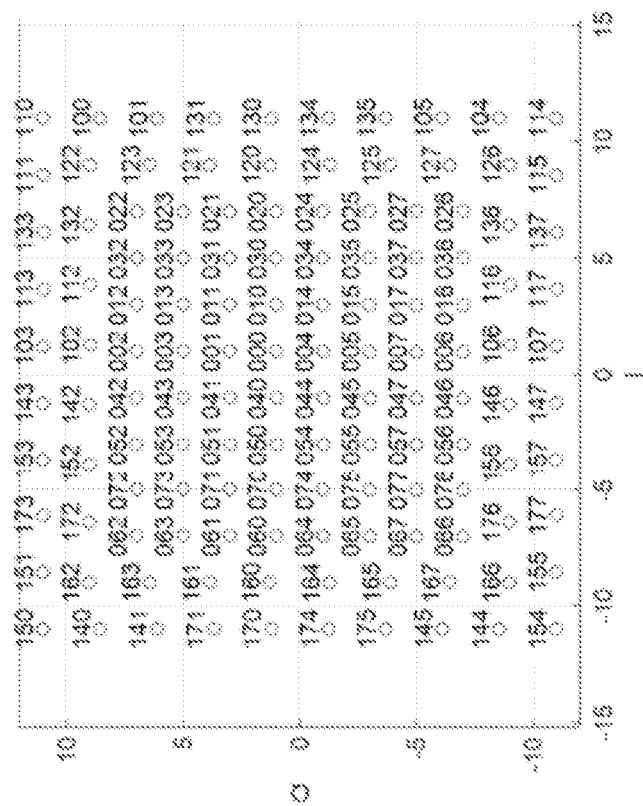
FIG. 6 shows an example of a 128-point constellation and adopted mapping in octal notation according to an embodiment of the present disclosure.

The proposed 128-symbol constellation, namely, CS-128QAM, and the adopted quasi-Gray mapping are illustrated in FIG. 6.

Figure 7:
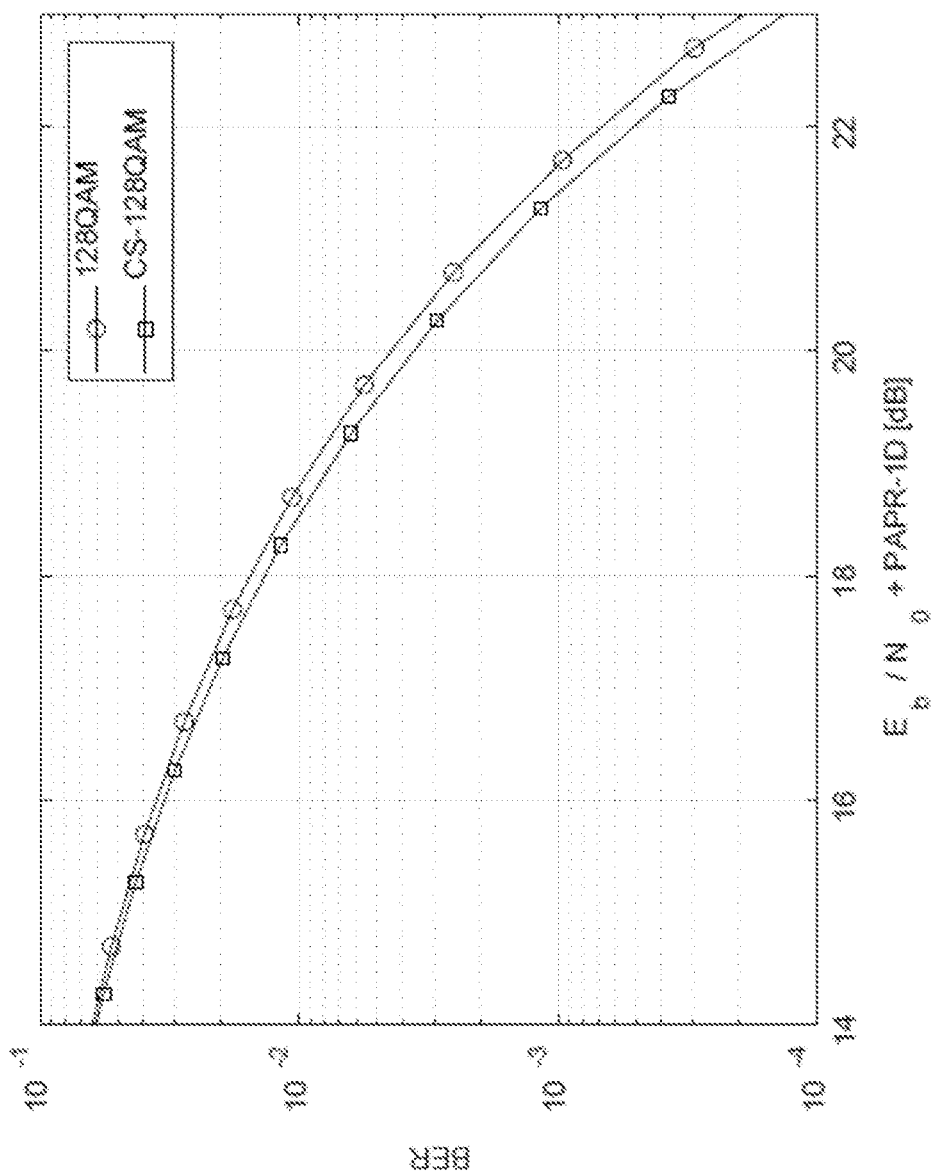
FIG. 7 shows an example of performance of a 128-symbol constellation over the AWGN channel according to an embodiment of the present disclosure.

As shown in FIG. 7, over the AWGN channel the 128-point constellation (CS-128QAM) according to this embodiment of the present disclosure performs ~0.3 dB better than cross-128QAM (illustrated on the right side of FIG. 2) in terms of $Eb/N0+PAPR-1D$.

FIG. 8 shows a receiving device 310 according to an embodiment of the disclosure. The receiving device 310 is configured to use two-dimensional symbol constellations. The receiving device 310 of FIG. 8 may particularly be the receiving device 310 of FIG. 3. The transmitting device 300 shown in FIG. 8 may be the one shown in FIG. 3. The receiving device 310 may be a receiver or may be included in a receiver.

The receiving device 310 may be configured to operate inversely to the transmitting device 300 of FIG. 3. In particular, the receiving device 310 is configured to receive a sequence of noisy discrete constellation symbols 304; demap the sequence of noisy discrete constellation symbols 304 to output data 305 using a two-dimensional 2n-symbol constellation 302, where n is an odd number not less than 3, wherein the two-dimensional 2n-symbol constellation 302 consists of 2n points arranged along the perimeters of q concentric squares, where q is a positive integer.

The receiving device 310 may be a receiver in an optical system, or other communication systems, comprising components like a bit-decoder and a bit-demapper.

Optionally, the receiving device 310 may be configured to receive a signal, particularly from a transmitting device 300; and convert the received signal to a sequence of noisy discrete constellation symbols 304. The transmitting device 300 may be a transmitter in an optical system, or other communication systems, comprising components like a bit-encoder and a bit-mapper.

The signal transmitted from the transmitting device 300 may be received and converted at the receiving device 310. The sequence obtained after the transmission and converting process is not an ideal discrete constellation symbols sequence, but a sequence of noisy discrete constellation symbols 304.

Optionally, the receiving device may be further configured to perform a hard demapping or a soft demapping based on a Gray mapping or a quasi-Gray.

At the receiver side, the bit-demapper can provide tentative decisions (hard demapper) or probabilities of each bit being 0 or 1 (soft demapper).

The receiving device 310 uses the same constellation 302 as the transmitting device 300. The two-dimensional 2n-symbol constellation 302 applied in this embodiment contains all the features as described in the previous embodiments regarding the transmitting device 300. As explained in the previous embodiments, usually the constellation is fixed and agreed upon before operation. In case a dynamic constellation selection during operation is required, a signaling protocol between the transmitting device 300 and the receiving device 310 must be predefined.

Figure 9:
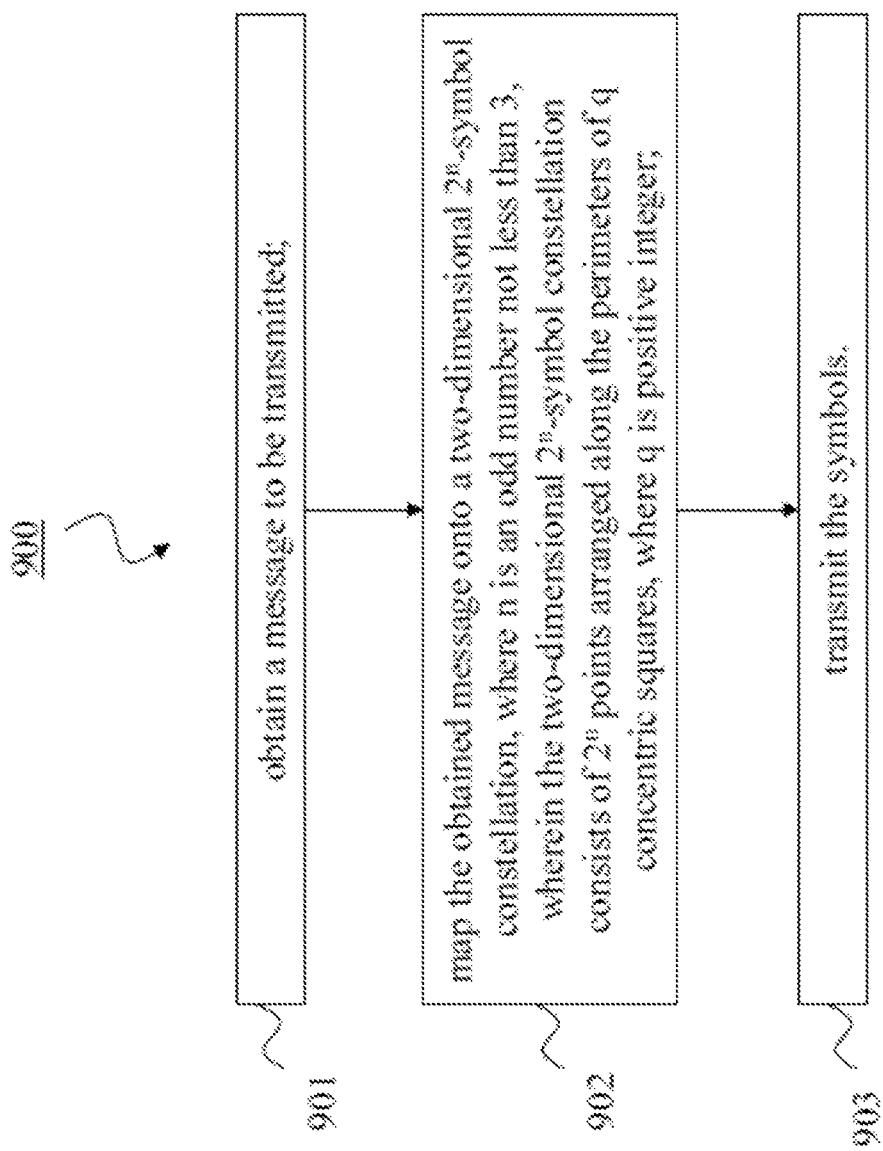
FIG. 9 shows a schematic block flowchart of a method for transmitting messages using two-dimensional symbol constellations according to an embodiment of the present disclosure.

FIG. 9 shows a method 900 for transmitting messages using two-dimensional symbol constellations according to an embodiment of the present disclosure. In particular, the method 900 is performed by a transmitting device. The method comprising a step 901 of obtaining a message to be transmitted; a step 902 of mapping the obtained message onto a two-dimensional 2n-symbol constellation, where n is an odd number not less than 3, wherein the two-dimensional 2n-symbol constellation consists of 2n points arranged along the perimeters of q concentric squares, where q is positive integer; and a step 903 of transmitting the symbols.

Figure 10:
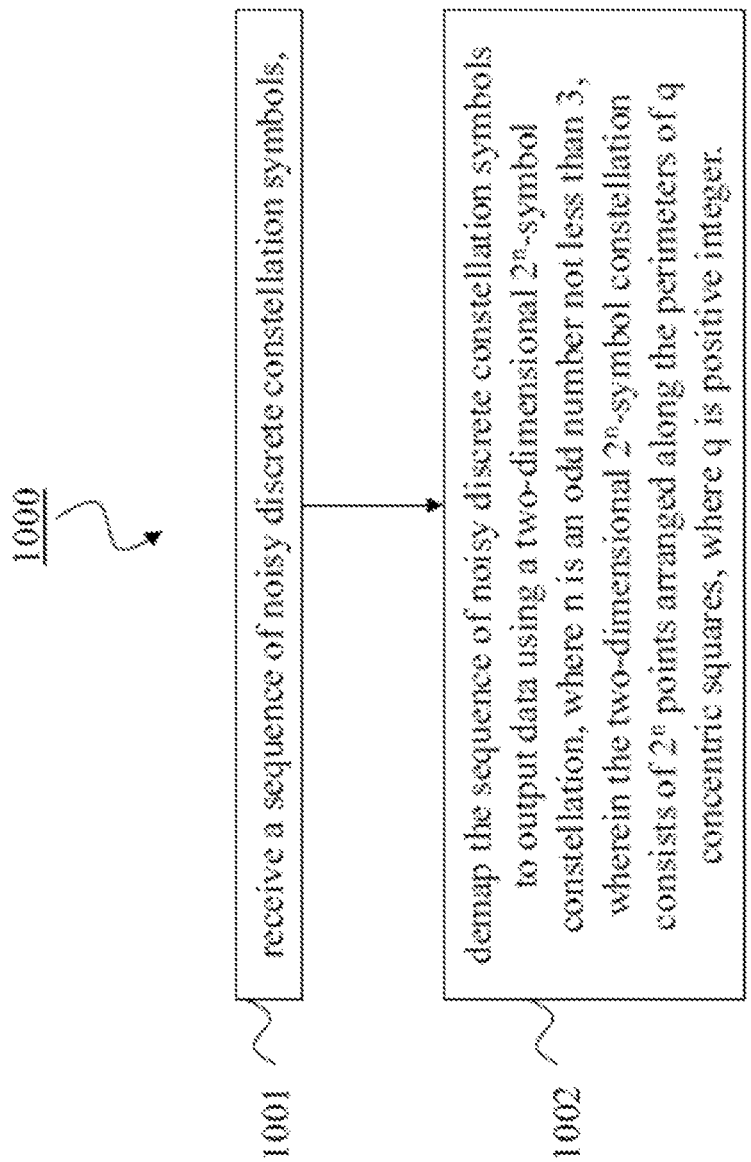
FIG. 10 shows a schematic block flowchart of another method for receiving messages using two-dimensional symbol constellations according to an embodiment of the present disclosure.

FIG. 10 shows a method 1000 for receiving messages using two-dimensional symbol constellations according to an embodiment of the present disclosure. In particular, the method 1000 is performed by a receiving device. The method comprising a step 1001 of receiving a sequence of noisy discrete constellation symbols; a step 1002 of demapping the sequence of noisy discrete constellation symbols to output date using a two-dimensional 2n-symbol constellation, where n is an odd number not less than 3, wherein the two-dimensional 2n-symbol constellation consists of 2n points arranged along the perimeters of q concentric squares, where q is positive integer.

In summary, embodiments of the present disclosure achieve multiple benefits. The proposed class of constellations is particularly useful for optical coherent and intensity modulation and direct detection (IM-DD) transmission systems. Advantages are summarized as, the constellations according to embodiments of the present disclosure show a comparable noise sensitivity to traditional cross-constellations and, at the same time, thanks to the reduced PAPR-1D, achieve a higher transmit power; the increase of the transmit power is especially important in unamplified systems to enhance the available power budget; in case of amplified systems, the increased transmit power is beneficial because it can potentially enable a lower error vector magnitude (EVM) of the transmit signal; the constellations according to embodiments of the present disclosure can be employed also in IM-DD systems by transmitting the I and Q components over two subsequent signaling intervals; and the constellations according to embodiments of the present disclosure are also designed to work well with feed-forward CPE schemes, which are typically used in optical coherent transmissions.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A transmitting device using two-dimensional symbol constellations, wherein the transmitting device comprises:
 a memory comprising instructions; and
 a processor coupled to the memory and configured to execute the instructions to cause the transmitting device to:
  obtain a message to be transmitted;
  map the message onto a two-dimensional $2^n$-symbol constellation to obtain a sequence of discrete constellation symbols, wherein n is an odd number not less than 3, wherein the two-dimensional $2^n$-symbol constellation comprises $2^n$ points arranged along perimeters of q concentric squares, wherein points in each concentric square of the q concentric squares are uniformly spaced along the perimeters and four points are located at corners of the concentric squares, and wherein q is a positive integer; and
  transmit the discrete constellation symbols,
 wherein first pairs of sides of the q concentric squares are parallel to an I axis, and second pairs of the sides of the q concentric squares are parallel to a Q axis, wherein a center of the squares coincides with an origin of an in-phase-quadrature (I-Q) plane, wherein a side of an i-th square has length $L_i$, with $L_1 \leq L_2 \leq \ldots < L_q$, wherein the i-th square contains $4 \cdot N_i$ points, wherein $N_i$ is an integer, wherein $N_1 \leq N_2 \leq \ldots \leq N_q$, and wherein the parameters $L = [L_1, \ldots, L_q]$ and $N = [N_1, \ldots, N_q]$ have been optimized by minimizing a cost function.

2. The transmitting device of claim 1, wherein the instructions further cause the transmitting device to:
 convert the sequence of discrete constellation symbols to a signal matched to a transmission channel; and
 transmit the signal to a receiving device.

3. The transmitting device of claim 2, wherein the signal comprises a bandpass signal.

4. The transmitting device of claim 1, wherein the cost function is expressed as:

$$f(L,N) = \text{RSNR} + \text{PAPR1D},$$

wherein $L = [L_1, L_2, \ldots, L_q]$, $N = [N_1, N_2, \ldots, N_q]$, wherein RSNR represents a required signal-to-noise ratio at a target bit error rate (BER), wherein PAPR1D represents a peak-to-average power ratio in one dimension, and wherein RSNR and PAPR1D are expressed in decibels.

5. The transmitting device of claim 1, wherein n is equal to 5, q is equal to 3, $L_1$ is equal to 2, $L_2$ is equal to 6, $L_3$ is equal to 10, $N_1$ is equal to 1, $N_2$ is equal to 3, and $N_3$ is equal to 4.

6. The transmitting device of claim 1, wherein n is equal to 7, q is equal to 6, $L_1$ is equal to 2, $L_2$ is equal to 6, $L_3$ is equal to 10, $L_4$ is equal to 14, $L_5$ is equal to 18, $L_6$ is equal to 22, $N_1$ is equal to 1, $N_2$ is equal to 3, $N_3$ is equal to 5, $N_4$ is equal to 7, $N_5$ is equal to 7, and $N_6$ is equal to 9.

7. The transmitting device of claim 1, wherein the instructions further cause the transmitting device to perform a Gray mapping or a quasi-Gray mapping to map the message onto the two-dimensional $2^n$-symbol constellation.

8. The transmitting device of claim 1, wherein the transmitting device comprises a bit-encoder and a bit-mapper.

9. A receiving device using two-dimensional symbol constellations, wherein the receiving device comprises:
 a memory comprising instructions; and
 a processor coupled to the memory and configured to execute the instructions to cause the receiving device to:
  receive a sequence of noisy discrete constellation symbols; and
  demap the sequence of noisy discrete constellation symbols to output data using a two-dimensional $2^n$-symbol constellation, wherein n is an odd number not less than 3, wherein the two-dimensional $2^n$-symbol constellation comprises $2^n$ points arranged along perimeters of q concentric squares, wherein points in each concentric square of the q concentric squares are uniformly spaced along the perimeters and four points are located at corners of the concentric squares, and wherein q is a positive integer, wherein first pairs of sides of the q concentric squares are parallel to an I axis, and second pairs of the sides of the q concentric squares are parallel to a Q axis, wherein a center of the squares coincides with an origin of an in-phase-quadrature (I-Q) plane, wherein a side of an i-th square has length $L_i$, with $L_1 \leq L_2 \leq \ldots < L_q$, wherein the i-th square contains $4 \cdot N_i$ points, wherein $N_i$ is an integer, wherein $N_1 \leq N_2 \leq \ldots \leq N_q$, and wherein the parameters $L=[L_1, \ldots, L_q]$ and $N=[N_1, \ldots, N_q]$ have been optimized by minimizing a cost function.

10. The receiving device of claim 9, wherein the instructions further cause the receiving device to:

receive a signal from a transmitting device; and convert the signal to the sequence of noisy discrete constellation symbols.

11. The receiving device of claim 10, wherein the signal comprises a bandpass signal.

12. The receiving device of claim 9, wherein the instructions further cause the receiving device to perform a hard demapping or a soft demapping based on a Gray or a quasi-Gray mapping.

13. The receiving device of claim 9, wherein the receiving device comprises a bit-decoder and a bit-demapper.

14. A method for transmitting messages using two-dimensional symbol constellations, wherein the method comprises:

obtaining a message to be transmitted;

mapping the message onto a two-dimensional $2^n$-symbol constellation to obtain a sequence of discrete constellation symbols, wherein n is an odd number not less than 3, wherein the two-dimensional $2^n$-symbol constellation comprises $2^n$ points arranged along perimeters of q concentric squares, wherein points in each concentric square of the q concentric squares are uniformly spaced along the perimeters and four points are located at corners of the concentric squares, and wherein q is a positive integer; and transmitting the discrete constellation symbols, wherein first pairs of sides of the q concentric squares are parallel to an I axis, and second pairs of the sides of the q concentric squares are parallel to a Q axis, wherein a center of the squares coincides with an origin of an in-phase-quadrature (I-Q) plane, wherein a side of an i-th square has length $L_i$, with $L_1 \leq L_2 \leq \ldots < L_q$, wherein the i-th square contains $4 \cdot N_i$ points, wherein $N_i$ is an integer, wherein $N_1 \leq N_2 \leq \ldots \leq N_q$, and wherein the parameters $L=[L_1, \ldots, L_q]$ and $N=[N_1, \ldots, N_q]$ have been optimized by minimizing a cost function.

15. The method of claim 14, further comprising:

converting the sequence of discrete constellation symbols to a signal matched to a transmission channel; and transmitting the signal to a receiving device.

16. The method of claim 15, wherein the signal comprises a bandpass signal.

17. The method of claim 15, wherein the receiving device comprises a bit-decoder and a bit-demapper.

18. The method of claim 14, wherein the cost function is expressed as:

$f(L,N) = RSNR + PAPR1D$, wherein $L=[L_1, L_2, \ldots, L_q]$, $N=[N_1, N_2, \ldots, N_q]$, wherein RSNR represents a required signal-to-noise ratio at a target bit error rate (BER), wherein PAPR1D represents a peak-to-average power ratio in one dimension, and wherein RSNR and PAPR1D are expressed in decibels.

19. The method of claim 14, wherein n is equal to 5, q is equal to 3, $L_1$ is equal to 2, $L_2$ is equal to 6, $L_3$ is equal to 10, $N_1$ is equal to 1, $N_2$ is equal to 3, and $N_3$ is equal to 4.

20. The method of claim 14, wherein n is equal to 7, q is equal to 6, $L_1$ is equal to 2, $L_2$ is equal to 6, $L_3$ is equal to 10, $L_4$ is equal to 14, $L_5$ is equal to 18, $L_6$ is equal to 22, $N_1$ is equal to 1, $N_2$ is equal to 3, $N_3$ is equal to 5, $N_4$ is equal to 7, $N_5$ is equal to 7, and $N_6$ is equal to 9.

* * * * *

UNITED STATES PATENT AND TRADEMARK OFFICE
CERTIFICATE OF CORRECTION

PATENT NO. : 11,658,860 B2
APPLICATION NO. : 17/398418
DATED : May 23, 2023
INVENTOR(S) : Stefano Calabro et al.

It is certified that error appears in the above-identified patent and that said Letters Patent is hereby corrected as shown below:

In the Claims

Claim 1, Column 10, Line 13: "has length $L_i$, with" should read "has length $L_i$ with"

Claim 1, Column 10, Line 14: "$L_1 \leq L_2 \leq ... < L_q$" should read "$L_1 < L_2 < ... < L_q$"

Claim 9, Column 11, Line 9: "has length $L_i$, with" should read "has length $L_i$ with"

Claim 10, Column 11, Line 10: "$L_1 \leq L_2 \leq ... < L_q$" should read "$L_1 < L_2 < ... < L_q$"

Claim 14, Column 12, Line 9: "has length $L_i$, with" should read "has length $L_i$ with"

Claim 14, Column 12, Line 10: "$L_1 \leq L_2 \leq ... < L_q$" should read "$L_1 < L_2 < ... < L_q$"

Signed and Sealed this
Fourth Day of July, 2023

Katherine Kelly Vidal
*Director of the United States Patent and Trademark Office*